(12) United States Patent
Kim et al.

(10) Patent No.: US 12,122,895 B2
(45) Date of Patent: Oct. 22, 2024

(54) PLASTICIZER COMPOSITION AND RESIN COMPOSITION INCLUDING THE SAME

(71) Applicant: LG CHEM, LTD., Seoul (KR)

(72) Inventors: Hyun Kyu Kim, Daejeon (KR); Jeong Ju Moon, Daejeon (KR); Woo Hyuk Choi, Daejeon (KR); Yun Ki Cho, Daejeon (KR); Joo Ho Kim, Daejeon (KR); Seok Ho Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 943 days.

(21) Appl. No.: 17/052,156

(22) PCT Filed: Aug. 23, 2019

(86) PCT No.: PCT/KR2019/010743
§ 371 (c)(1),
(2) Date: Oct. 30, 2020

(87) PCT Pub. No.: WO2020/045901
PCT Pub. Date: Mar. 5, 2020

(65) Prior Publication Data
US 2021/0363324 A1    Nov. 25, 2021

(30) Foreign Application Priority Data

Aug. 27, 2018 (KR) ............. 10-2018-0100356

(51) Int. Cl.
*C08K 5/12* (2006.01)
*C08F 14/06* (2006.01)

(52) U.S. Cl.
CPC ............. *C08K 5/12* (2013.01); *C08F 14/06* (2013.01)

(58) Field of Classification Search
CPC ........................................................ C08K 5/12
See application file for complete search history.

(56) References Cited

U.S. PATENT DOCUMENTS

| | | |
|---|---|---|
| 2014/0212666 A1 | 7/2014 | Dakka et al. |
| 2014/0213709 A1 | 7/2014 | Dakka et al. |
| 2014/0315021 A1 | 10/2014 | Naert et al. |
| 2014/0336319 A1 | 11/2014 | Kim et al. |
| 2015/0080545 A1 | 3/2015 | Dakka et al. |
| 2015/0080546 A1 | 3/2015 | Dakka et al. |
| 2015/0140350 A1 | 5/2015 | Dakka et al. |
| 2016/0237022 A1 | 8/2016 | Dakka et al. |
| 2016/0237243 A1 | 8/2016 | Woldt et al. |
| 2016/0272780 A1 | 9/2016 | Kim et al. |
| 2016/0376219 A1 | 12/2016 | Kim et al. |
| 2017/0081501 A1 | 3/2017 | Kim et al. |
| 2017/0313850 A1 | 11/2017 | Pfeiffer et al. |
| 2018/0002268 A1 | 1/2018 | Kim et al. |
| 2018/0022689 A1 | 1/2018 | Dakka et al. |
| 2018/0072867 A1 | 3/2018 | Kim et al. |
| 2018/0134870 A1 | 5/2018 | Tiyapiboonchaiya et al. |
| 2019/0047938 A1 | 2/2019 | Kim et al. |
| 2019/0048167 A1 | 2/2019 | Kim et al. |
| 2019/0211183 A1 | 7/2019 | Kim et al. |
| 2020/0190282 A1 | 6/2020 | Kim et al. |
| 2021/0130577 A1 | 5/2021 | Kim et al. |

FOREIGN PATENT DOCUMENTS

| | | |
|---|---|---|
| CN | 104603193 A | 5/2015 |
| CN | 106795325 A | 5/2017 |
| CN | 107428992 A | 12/2017 |
| EP | 2851393 A1 | 3/2015 |
| EP | 3059221 A1 | 8/2016 |
| EP | 3663344 A1 | 6/2020 |
| JP | 2011190320 A * | 9/2011 |
| JP | 2017509592 A | 4/2017 |
| KR | 10-2014-0132697 | 11/2014 |
| KR | 10-2015-0093608 | 8/2015 |
| KR | 10-2016-0130363 | 11/2016 |
| KR | 10-1731366 | 4/2017 |
| KR | 10-2018-0022680 | 3/2018 |
| KR | 10-2018-0028035 | 3/2018 |
| KR | 10-2018-0092888 | 8/2018 |
| MX | 2020002959 A | 8/2020 |
| MX | 2020003950 A | 8/2020 |
| RU | 2015156846 | 7/2017 |
| TW | 201700568 | 1/2017 |
| WO | 2008140177 A1 | 11/2008 |
| WO | 2016-055573 | 4/2016 |
| WO | 2018048170 A1 | 3/2018 |

OTHER PUBLICATIONS

Sasaki et al. English machine translation of JP 2011190320A. (Year: 2011).*

* cited by examiner

*Primary Examiner* — Peter F Godenschwager
(74) *Attorney, Agent, or Firm* — Bryan Cave Leighton Paisner LLP

(57) ABSTRACT

Provided is a plasticizer composition, comprising: two or more kinds of terephthalates of the same carbon number type, wherein the carbon number of alkyl groups bonded to two ester groups is the same; and one or more kinds of terephthalates of a different carbon number type, wherein the carbon number of alkyl groups bonded to two ester groups is different, the different carbon number type comprises a higher alkyl and a lower alkyl, the higher alkyl is selected from alkyl groups having a carbon number of 8 or less, and the lower alkyl is selected from alkyl groups having a carbon number of 5 or more.

6 Claims, No Drawings

PLASTICIZER COMPOSITION AND RESIN COMPOSITION INCLUDING THE SAME

CROSS-REFERENCE TO RELATED APPLICATIONS

The present application is a National Stage Application of International Application No. PCT/KR2019/010743 filed on Aug. 23, 2019, which claims the benefit of priority to Korean Patent Application No. 10-2018-0100356, filed on Aug. 27, 2018, the entire disclosure of which is incorporated herein by reference.

TECHNICAL FIELD

The present invention relates to a plasticizer composition which includes two or more terephthalates of the same carbon number type and one or more terephthalates of a different carbon number type, and a resin composition including the same.

BACKGROUND ART

Generally, plasticizers are obtained through the reaction of alcohols with polycarboxylic acids such as phthalic acid and adipic acid to form corresponding esters. In addition, considering the internal and external regulations on harmful phthalate-based plasticizers to the human body, studies are being continued on plasticizer compositions which can replace phthalate-based plasticizers such as terephthalate-based, adipate-based and other polymer-based plasticizers.

Meanwhile, regardless of the type of industry including plastisol type of industry for manufacturing finished products such as flooring materials, wallpaper, soft and hard sheets, gloves, wires, hoses, and films, calendaring type of industry, extrusion/injection compound type of industry, the demand for eco-friendly products is increasing. In order to reinforce the quality properties, processability and productivity by the finished products, an appropriate plasticizer is required considering discoloration, migration, mechanical properties, etc.

According to the properties required by the types of industry in various areas of usage, such as tensile strength, elongation, light resistance, migration, gelling properties and absorption rate, supplementary materials such as a plasticizer, a filler, a stabilizer, a viscosity decreasing agent, a dispersant, a defoaming agent and a foaming agent are mixed with a PVC resin.

For example, in case of applying di(2-ethylhexyl) terephthalate (DEHTP) which is relatively cheap and widely used among plasticizer compositions which can be applied to PVC, hardness or sol viscosity is high, absorption rate of a plasticizer is relatively slow, and migration and stress migration are not good.

As improvements on the above limitations, the application of a transesterification product with butanol as a plasticizer, as a composition including DEHTP can be considered. In this case, plasticization efficiency is improved but migration or thermal stability is inferior and mechanical properties are somewhat degraded, and the improvement of physical properties is required. Accordingly, there is no solution but employing a method compensating the defects through mixing with a second plasticizer at the present time.

However, in case of applying the second plasticizer, the change of the physical properties is hard to predict, the application can become a factor in increasing the product unit cost, and the improvement of the physical properties is not clearly shown except for specific cases, and the research is slowly conducted.

BRIEF DESCRIPTION

Technical Problem

The present invention provides a plasticizer composition which includes two or more kinds of terephthalates of the same carbon number type and one or more kinds of terephthalates of a different carbon number type and which can maintain to equivalent levels or improve plasticization efficiency and mechanical properties and at the same time, can improve migration loss and stress resistance when compared with the conventional plasticizer, by applying the terephthalates of a different carbon number type having a difference of the carbon number of alkyl groups combined with two ester groups of 3 or less.

Technical Solution

To solve the tasks, there is provided in an embodiment of the present invention, a plasticizer composition including: two or more kinds of terephthalates of the same carbon number type where the carbon number of alkyl groups bonded to two ester groups is the same; and one or more kinds of terephthalates of a different carbon number type where the carbon number of alkyl groups bonded to two ester groups is different, wherein the different carbon number type includes a higher alkyl and a lower alkyl, and the higher alkyl is selected from alkyl groups having a carbon number of 8 or less and the lower alkyl is selected from alkyl groups having a carbon number of 5 or more.

In order to solve the tasks, there is provided in another embodiment of the present invention, a resin composition including 100 parts by weight of a resin and 5 to 150 parts by weight of the plasticizer composition.

The resin can be one or more selected from the group consisting of straight vinyl chloride polymers, paste vinyl chloride polymers, ethylene vinyl acetate copolymers, ethylene polymers, propylene polymers, polyketones, polystyrenes, polyurethanes, natural rubbers, synthetic rubbers and thermoplastic elastomers.

Advantageous Effects

The plasticizer composition according to an embodiment of the present invention, if used in a resin composition, can maintain and improve plasticization efficiency and mechanical properties to the same or better degrees when compared with the conventional plasticizer, and at the same time, can improve viscosity, stability, migration loss and stress resistance.

DETAILED DESCRIPTION

It will be understood that terms or words used in the present disclosure and claims should not be interpreted as having a meaning that is defined in common or in dictionaries, however should be interpreted as consistent with the technical scope of the present invention based on the principle that inventors can appropriately define the concept of the terms to explain the invention at his best method.

Definition of Terms

The term "composition" used in the disclosure includes a mixture of materials including the corresponding composition as well as a reaction product and a decomposition product formed from the materials of the corresponding composition.

The prefix "iso-" used in the disclosure means an alkyl group in which a methyl group which has 1 carbon atom is combined as a branched chain with the main chain of the alkyl group, and generally, means an alkyl group in which a methyl branch is combined at the terminal of the alkyl group, and in the disclosure, can be used as a general term of an alkyl group in which a methyl group and/or an ethyl group are combined as branched chains with a main chain, including a case of being combined at the terminal, unless otherwise no separate alkyl group is present.

The terms "the same carbon number type" and a "different carbon number type" used in the disclosure are for classifying terephthalates, and the "same carbon number type" means a terephthalate in which the carbon numbers of alkyl groups bonded to two ester groups are the same, and the "different carbon number type" means a terephthalate in which the carbon numbers of alkyl groups bonded to two ester groups are different, irrespective of symmetry or asymmetry.

The term "straight vinyl chloride polymer" used in the disclosure can be one of vinyl chloride polymers and polymerized by suspension polymerization, bulk polymerization, etc., and can refer to a polymer having a porous particle shape in which a large number of pores having a size of tens to hundreds of micrometers, no cohesiveness, and excellent flowability.

The term "paste vinyl chloride polymer" used in the disclosure can be one of vinyl chloride polymers and polymerized by microsuspension polymerization, microseed polymerization, emulsion polymerization, etc., and can refer to a polymer having minute particles without pores and a size of tens to thousands of nanometers, cohesiveness, and inferior flowability.

The terms "comprising", and "having" and the derivatives thereof in the present invention, though these terms are particularly disclosed or not, do not intended to preclude the presence of optional additional components, steps, or processes. In order to avoid any uncertainty, all compositions claimed by using the term "comprising" can include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

Measurement Method

In the present disclosure, the content analysis of the components in a composition is conducted by gas chromatography measurement using a gas chromatography equipment of Agilent Co. (product name: Agilent 7890 GC, column: HP-5, carrier gas: helium (flow rate of 2.4 ml/min), detector: F.I.D., injection volume: 1 μl, initial value: 70° C./4.2 min, end value: 280° C./7.8 min, program rate: 15° C./min).

In the disclosure, "hardness" means Shore hardness (Shore "A" and/or Shore "D") at 25° C. and is measured in conditions of 3T 10s using ASTM D2240. The hardness can be an index for evaluating plasticization efficiency, and the lower the value, the better the plasticization efficiency.

In the disclosure, "tensile strength" is obtained according to an ASTM D638 method by drawing a specimen in a cross head speed of 200 mm/min (1 T) using a test apparatus of U.T.M. (manufacturer: Instron, model name: 4466), measuring a point where the specimen is cut, and calculating according to the following Mathematical Formula 1:

Tensile strength (kgf/cm$^2$)=load value (kgf)/thickness (cm)×width (cm)　　Mathematical Formula 1

In the disclosure, "elongation rate" is obtained according to an ASTM D638 method by drawing a specimen in a cross head speed of 200 mm/min (1 T) using the U.T.M., measuring a point where the specimen is cut, and calculating according to the following Mathematical Formula 2:

Elongation rate (%)=length after elongation/initial length×100　　Mathematical Formula 2

In the disclosure, "migration loss" is obtained according to KSM-3156, by which a specimen with a thickness of 2 mm or more is obtained, glass plates are attached onto both sides of the specimen and a load of 1 kgf/cm$^2$ is applied. The specimen is stood in a hot air circulation type oven (80° C.) for 72 hours, then taken out therefrom and cooled at room temperature for 4 hours. Then, the glass plates attached onto both sides of the specimen are removed, the weights of the specimen before and after standing the glass plates and the specimen in the oven are measured, and the migration loss is calculated according to the following Mathematical Formula 3:

Migration loss (%)={(initial weight of specimen at room temperature−weight of specimen after standing in oven)/initial weight of specimen at room temperature}×100　　Mathematical Formula 3

In the disclosure, "volatile loss" is obtained by processing a specimen at 80° C. for 72 hours and then, measuring the weight of the specimen.

Volatile loss (wt %)={(weight of initial specimen−weight of specimen after processing)/weight of initial specimen}×100　　Mathematical Formula 4

In the disclosure, "absorption rate" is evaluated by measuring the time required for mixing a resin and a plasticizer and stabilizing the torque of a mixer by using a planetary mixer (Brabender, P600) in conditions of 77° C. and 60 rpm.

In case of the various measurement conditions, the detail of the conditions of the temperature, the speed of revolution, the time, etc., can be somewhat different according to situations, and if the conditions are different, a measurement method and its conditions were separately indicated.

Hereinafter, the present invention will be explained in more detail to assist the understanding of the present invention.

According to an embodiment of the present invention, the plasticizer composition includes two or more kinds of terephthalates of the same carbon number type in which the carbon number of alkyl groups bonded to two ester groups is the same; and one or more kinds of terephthalates of a different carbon number type in which the carbon number of alkyl groups bonded to two ester groups is different, wherein the different carbon number type includes both a higher alkyl and a lower alkyl, and the higher alkyl is selected from alkyl groups having a carbon number of 8 or less and the lower alkyl is selected from alkyl groups having a carbon number of 5 or more.

According to an embodiment of the present invention, the plasticizer composition includes the same carbon number type in which the carbon number of alkyl groups bonded to two ester groups is the same, and two or more terephthalates of the same carbon number type are included.

The same carbon number type means that alkyl groups bonded to two ester groups which are present in a terephthalate are the same and the terephthalate has alkyl groups having the same carbon number with a benzene ring as a center. Here, the two kinds of the terephthalates of the same carbon number type can be classified into a higher alkyl terephthalate having a carbon number of 8 or less and a lower alkyl terephthalate having a carbon number of 5 or more and included at the same time.

In case where a terephthalate having a carbon number of greater than 8 is applied as the higher alkyl, plasticization efficiency can be negatively influenced and it is undesirable, and in case where a terephthalate having a carbon number of less than 5 is applied as the lower alkyl, the solubility of an alcohol which is the raw material of the alkyl group in water can rapidly increase in a preparation process, and accordingly, various problems including problems on the increase in expense caused by a separation process from water, problems on treatment of increased amount of wastewater due to difficult separation, and so on, can be induced.

The same carbon number type can be alkyl groups which are bonded to two ester groups and can include n-pentyl, isopentyl, n-hexyl, isohexyl, n-heptyl, isoheptyl or 2-ethylhexyl. Here, the alkyl classified as the lower alkyl can include n-pentyl, isopentyl, n-hexyl, isohexyl, n-heptyl and isoheptyl, which have 5 to 7 carbon atoms.

Here, "isopentyl" is the generic term of alkyl groups with 5 carbon atoms, of which main chain is a propyl group or a butyl group and branch chain is a methyl group or an ethyl group. For example, a 2-methylbutyl group, a 3-methylbutyl group, 2-ethylpropyl, or the like can be applied.

In addition, here, "isohexyl" is the generic term of alkyl groups with 6 carbon atoms, of which main chain is a butyl group or a pentyl group and branch chain is a methyl group or an ethyl group. For example, 2-methylpentyl, 3-methylpentyl, 4-methylpentyl, 2-ethylbutyl, 2,2-dimethylbutyl, 2,3-dimethylbutyl, 2,4-dimethylbutyl, 2-ethylbutyl, 3-ethylbutyl, or the like can be applied.

In addition, here, "isoheptyl" is the generic term of alkyl groups having 7 carbon atoms of which main chain is a pentyl group or a hexyl group and branch chain is a methyl group or an ethyl group. For example, 2-methylhexyl, 3-methylhexyl, 4-methylhexyl, 5-methylhexyl, 2-ethylpentyl, 3-ethylpentyl, 4-ethylpentyl, 2,2-dimethylpentyl, 2,3-dimethylpentyl, 2,4-dimethylpentyl, 2,5-dimethylpentyl, 3,3-dimethylpentyl, 3,4-dimethylpentyl, 3,5-dimethylpentyl, 4,4-dimethylpentyl, 4,5-dimethylpentyl, 5,5-dimethylpentyl, or the like can be applied.

In addition, the alkyl group classified as the higher alkyl can be alkyl groups having 6 to 8 carbon atoms, and the alkyl groups having 6 to 7 carbon atoms are the same as described above, and alkyl groups having 8 carbon atoms can be 2-ethylhexyl.

Considering that a difference of a carbon number between n-pentyl, isopentyl, 2-methylbutyl, n-hexyl, isohexyl, n-heptyl and isoheptyl, which can be bonded to the lower alkyl terephthalate, and 2-ethylhexyl which can be bonded to the higher alkyl terephthalate is 3 or less, if applied to a resin, plasticization efficiency can be maintained to an equivalent level but volatile loss and mechanical properties can be excellent when compared to a case having the difference of the carbon number of 4 which is greater than 3.

In addition, in another aspects, if applied to a paste vinyl chloride resin, viscosity stability can be significantly excellent and the improving effects of tensile strength and elongation rate as well as migration can be excellent when compared with a case having the difference of the carbon number of greater than 3.

More preferably, the difference of the carbon number of the different carbon number type can be 2 or 3, and in this case, more optimized effects of mechanical properties such as tensile strength and elongation rate as well as migration and stress resistance, and volatile loss can be obtained.

In order to achieve the above-described effects together with the carbon number characteristics of the same carbon number type, a terephthalate of a different carbon number type is required to be included. In this case, the carbon number difference of alkyl groups bonded to two ester groups of the terephthalate of a different carbon number type can be 3 or less, and an alkyl group with 5 to 7 carbon atoms and an alkyl group with 6 to 8 carbon atoms, respectively, can be applied.

Here, two alkyl groups bonded to the ester groups of the terephthalate of a different carbon number type can be the same as the alkyl group of the lower alkyl terephthalate and the alkyl group of the higher alkyl terephthalate of the same carbon number type, respectively, and in case of including a terephthalate of a different carbon number type including all the same alkyl groups in the alkyl groups of the same carbon atom types, the above-mentioned effects can be achieved.

Preferably, the lower alkyl can preferably have 5 or 6 carbon atoms among 5 to 7 carbon atoms, and the higher alkyl can preferably have 8 carbon atoms among 6 to 8 carbon atoms.

Particularly, the terephthalate of the same carbon number type can include, for example, di(2-ethyl hexyl) terephthalate, di(n-pentyl) terephthalate, diisopentyl terephthalate, di(2-methylbutyl) terephthalate, di(n-hexyl) terephthalate, diisohexyl terephthalate, di(n-heptyl) terephthalate, diisoheptyl terephthalate, or the like.

That is, the same carbon number type can be a symmetric type of which carbon numbers of mutual alkyl groups are the same and the structures thereof are the same. A terephthalate of an asymmetric type which has the same carbon number but different structures, i.e., alkyl groups having a relationship of structural isomers, can be included according to circumstances.

Such an asymmetric type terephthalate of the same carbon number type can be selected from, for example, (n-pentyl)(isopentyl) terephthalate, (n-hexyl)isohexyl terephthalate, or (n-heptyl)isoheptyl terephthalate, where each alkyl group of the "iso-" can be selected from the above-described various types of alkyl groups.

In addition, the terephthalate of a different carbon number type can be selected from the group consisting of, for example, (n-pentyl)(2-ethylhexyl) terephthalate, (isopentyl) (2-ethyl hexyl) terephthalate, (n-hexyl)(2-ethylhexyl) terephthalate, isohexyl(2-ethylhexyl) terephthalate, (n-heptyl) (2-ethylhexyl) terephthalate and isoheptyl(2-ethylhexyl) terephthalate, where the "iso-" is also the same as described above.

Meanwhile, the plasticizer composition according to another embodiment of the present invention can essentially include two kinds of terephthalates of the same carbon number type and one kind of terephthalate of a different carbon number type. Additionally, one or more kinds of terephthalates of the same carbon number type which has an alkyl group having different carbon number from the two kinds of the same carbon number type, can be included as the same carbon number type, and accordingly, a different carbon number type can be also further included. In this case, the terephthalate of a different carbon number type, which is essentially included, can be a higher alkyl having 8 carbon atoms, and the terephthalate of a different carbon number type which can be additionally included, can be a higher alkyl having 6 carbon atoms or a higher alkyl having 7 carbon atoms.

As described above, the inclusion of the terephthalate of a different carbon number type according to the further inclusion of one kind of the different carbon number type in addition to the two kinds which are essentially included to the same carbon number type, serves advantages of more minute control of physical properties and more optimal achievement of the improving effects of physical properties.

The plasticizer composition according to an embodiment of the present invention includes the same carbon number type and the different carbon number type as the terephthalates described above, and due to factors such as the number of terephthalates of each type, the kind of alkyl groups bonded and a carbon number difference between alkyl groups bonded, the physical properties such as volatile loss, migration resistance and stress resistance can be improved, furthermore, the viscosity stability of a resin can be enhanced, and plasticization efficiency or mechanical properties can be maintained and improved to a degree exceeding those of the conventional products.

Preferably, in case of the lower alkyl, i.e., the alkyl having 5 to 7 carbon atoms, the carbon number can be 5 to 6, and in case of an alkyl having 5 carbon atoms, n-pentyl, or isopentyl each can be applied and in case of an alkyl having 6 carbon atoms, n-hexyl or isohexyl each can be applied. However, considering the increasing degree of effects, a mixture derived from the mixture alcohol thereof can be preferably applied.

In addition, in case of applying a lower alkyl to the plasticizer composition, the application of a mixture product derived from a mixture alcohol can be preferably applied with respect to a single alkyl group from one single alcohol as a product as described above, and in this case, based on three or more kinds of terephthalate-based compositions thus produced, an alkyl can preferably have the degree of branching of 2.0 or less, more preferably, 1.5 or less.

Here, the "degree of branching" can mean the number of branched carbon atoms of the alkyl groups bonded to a material included in a composition, and the degree can be determined according to the weight ratio of the corresponding material. For example, if 60 wt % of n-hexyl alcohol, 30 wt % of methylpentyl alcohol, and 10 wt % of ethylbutyl alcohol are included in an alcohol mixture, the number of the branch carbon of each alcohol is 0, 1 or 2, and the degree of branching can be calculated by [(60×0)+(30×1)+(10×2)]/100 and can be 0.5. This degree of branching is computed based on the number of the same carbon.

Preferably, in case where the alkyl groups are derived from the mixture alcohol and the alkyl group applied to the terephthalate has 5 carbon atoms, examples can include n-pentyl, 2-methylbutyl, 3-methylbutyl, and the like, and in case where the alkyl group has 6 carbon atoms, examples can include n-hexyl, 2-methylpentyl, 2-ethylbutyl, 2,4-dimethylbutyl, and the like, and the above-described all isomers can be included.

As described above, if the mixture alkyl group from the mixture alcohol is materialized in the terephthalate-based plasticizer composition and the above-described degree of branching is satisfied, the improving effects of plasticization efficiency, migration, volatile loss, and the like can be expected.

According to an embodiment of the present invention, the plasticizer composition can have the moisture content with respect to the total weight of the composition of 100 ppm or less, preferably, 70 ppm or less, more preferably, 50 ppm or less based on a weight. If the moisture content in the plasticizer is high, the possibility of degenerating the plasticizer due to surrounding environmental factors is high and the possibility of generating defects during processing is high. Accordingly, the lower moisture contents in the plasticizer are more desirable.

More particularly, if the terephthalate included in a plasticizer composition includes three kinds of a lower alkyl terephthalate, a terephthalate of a different carbon number type and a higher alkyl terephthalate, each can be included in an amount of 0.5 to 50 wt %, 3.0 to 70 wt % and 0.5 to 95 wt % based on the total weight of the plasticizer composition, and these amounts are values in case where the total sum of the three kinds of the terephthalates is considered 100 wt %, but a case where another material is included in the plasticizer composition is not considered for the amount.

As described above, if the above-described amounts are satisfied, effects obtainable from the terephthalate of a different carbon number type, which has a carbon number difference of 3 or less, can be more preferably achieved, and the reproducibility of the effects can be excellent.

Further, considering the optimization of such effects, the amounts of the three kinds of the terephthalates can preferably be 0.5 to 30 wt %, 10 to 60 wt %, and 35 to 90 wt %.

The method for preparing the plasticizer composition according to an embodiment of the present invention is a well-known method in the art, and any methods can be applied without specific limitation only if the above-described plasticizer composition is prepared.

Particularly, as the above-described plasticizer composition, one including three kinds of terephthalates is the basic, and an esterification reaction can be used and transesterification reaction as well as direct esterification reaction can be applied.

For example, the direct esterification can be performed by a step of injecting terephthalic acid and two or more kinds of alcohols, adding a catalyst and reacting under a nitrogen atmosphere; a step of removing unreacted alcohol and neutralizing unreacted acid; and a step of dehydrating by distillation in a reduced pressure and filtering.

The alcohol can be a single alcohol having the same carbon number selected from the group consisting of n-pentanol, isopentanol, n-hexanol, isohexanol, n-heptanol and isoheptanol, or a mixture alcohol. The mixture alcohol can be a mixture of structural isomer alcohols and in this case, the degree of branching of the mixture alcohol can be 2.0 or less, preferably, 1.5 or less, as described above. As the other one kind, 2-ethylhexyl alcohol can be applied. The alcohol can be used in a range of 150 to 500 mol %, 200 to 400 mol %, 200 to 350 mol %, 250 to 400 mol %, or 270 to 330 mol % based on 100 mol % of the terephthalic acid.

The catalyst can be, for example, one or more selected from an acid catalyst such as sulfuric acid, hydrochloric acid, phosphoric acid, nitric acid, paratoluenesulfonic acid, methanesulfonic acid, ethanesulfonic acid, propanesulfonic acid, butanesulfonic acid, and alkyl sulfate, a metal salt such as aluminum lactate, lithium fluoride, potassium chloride, cesium chloride, calcium chloride, iron chloride, and aluminum phosphate, a metal oxide such as heteropoly acids, natural/synthetic zeolites, cation and anion exchange resins, and an organometal such as tetra alkyl titanate and polymers thereof. In a particular embodiment, the catalyst can be tetra alkyl titanate.

The amount used of the catalyst can be different according to the kind thereof, and for example, a homogeneous catalyst can be used in an amount of 0.01 to 5 wt %, 0.01 to 3 wt %, 1 to 5 wt % or 2 to 4 wt % based on total 100 wt % of reactants, and a heterogeneous catalyst can be used in an amount of 5 to 200 wt %, 5 to 100 wt %, 20 to 200 wt %, or 20 to 150 wt % based on total 100 wt % of reactants.

In this case, the reaction temperature can be within a range of 180 to 280° C., 200 to 250° C., or 210 to 230° C.

In another embodiment, a terephthalate compound can be prepared by the transesterification reaction by which di(2-ethylhexyl) terephthalate reacts with one or more kinds of alcohols having the same carbon number, i.e., single alcohols, selected from the group consisting of n-pentanol, isopentanol, n-hexanol, isohexanol, n-heptanol and isoheptanol, or a mixture alcohol which is a mixture of structural isomers. Here, the alkyl groups of the terephthalate and the alcohol can be exchanged.

"Transesterification" used in the present invention means the reaction of an alcohol and an ester as shown in Reaction 1 below to interchange R" of the ester with R' of the alcohol as shown in Reaction 1 below.

Reaction 1

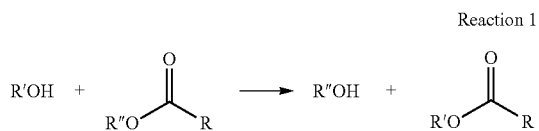

According to an embodiment of the present invention, if the transesterification is carried out, three kinds of ester compositions can be produced according to three cases: a case where the alkoxide of the alcohol attacks the carbon of two ester groups (RCOOR") which are present in the ester-based compound; a case where the alkoxide of the alcohol attacks the carbon of one ester group (RCOOR") which is present in the ester-based compound; and a unreacted case wherein no reaction is performed. In this case, if the alcohols injected are two or more kinds, the type and number of compositions produced stochastically can be anticipated, and the carbon number, kind and composition ratio of the alcohols injected in the transesterification can be designed and selected considering the quality of a final plasticizer composition.

In addition, the transesterification has advantages of not generating wastewater problems when compared with the esterification between acid-alcohol, being performed without a catalyst and solving defects occurring when using an acid catalyst.

The composition ratio of the mixture prepared through the transesterification can be controlled according to the addition amount of the alcohol. The amount added of the alcohol can be 0.1 to 89.9 parts by weight, particularly, 3 to 50 parts by weight, more particularly, 5 to 40 parts by weight based on 100 parts by weight of the terephthalate compound.

In regard of the terephthalate compound, since the mole fraction of the terephthalate which participates in the transesterification can increase according to the increase of the amount added of the alcohol, the amounts of two terephthalates which are products in the mixture can increase, and correspondingly, the amount of the terephthalate which is present as an unreacted state, can tend to decrease.

According to an embodiment of the present invention, the molar ratio of the reactants, terephthalate and alcohol can be, for example, 1:0.005 to 5.0, 1:0.05 to 2.5, or 1:0.1 to 1.0, and within this range, processing efficiency and economic feasibility can be excellent and a plasticizer composition capable of achieving the above-described effects can be obtained.

According to an embodiment of the present invention, the transesterification can preferably be performed at a reaction temperature of 120° C. to 190° C., preferably, 135° C. to 180° C., more preferably, 141° C. to 179° C. for 10 minutes to 10 hours, preferably, 30 minutes to 8 hours, more preferably, 1 to 6 hours. Within the temperature and time ranges, the composition ratio of a final plasticizer composition can be efficiently controlled. In this case, the reaction time can be calculated from a point when the reaction temperature reaches after elevating the temperature of the reactants.

The transesterification can be performed under an acid catalyst or a metal catalyst, and in this case, the effects of decreasing the reaction time can be achieved.

The acid catalyst can include, for example, sulfuric acid, methanesulfonic acid or p-toluenesulfonic acid, and the metal catalyst can include, for example, an organometal catalyst, a metal oxide catalyst, a metal salt catalyst, or a metal itself.

The metal component can be, for example, any one selected from the group consisting of tin, titanium and zirconium, or a mixture of two or more thereof.

In addition, a step of removing unreacted alcohol and reaction by-products by distillation can be further included after the transesterification. The distillation can be, for example, a two-step distillation by which the alcohol and the by-products are individually separated using the difference of the boiling points. In another embodiment, the distillation can be mixture distillation. In this case, effects of stably securing an ester-based plasticizer composition in a desired composition ratio can be achieved. The mixture distillation means distillation of the unreacted alcohol and the by-products simultaneously.

According to another embodiment of the present invention, a resin composition including the plasticizer composition and a resin is provided.

The resin can use resins well-known in the art. For example, a mixture of one or more selected from the group consisting of straight vinyl chloride polymers, paste vinyl chloride polymers, ethylene vinyl acetate copolymers, ethylene polymers, propylene polymers, polyketones, polystyrenes, polyurethanes, natural rubbers, synthetic rubbers and thermoplastic elastomers can be used, without limitation.

The plasticizer composition can be included in an amount of 5 to 150 parts by weight, preferably, 5 to 130 parts by weight, or 10 to 120 parts by weight based on 100 parts by weight of the resin.

Generally, the resin using the plasticizer composition can be prepared into a resin product through a melt processing or a plastisol processing, and a resin by the melt processing and a resin from the plastisol processing can be produced differently according to each polymerization method.

For example, in case of using a vinyl chloride polymer in a melt processing, solid phase resin particles having a large average particle diameter are prepared by suspension polymerization, or the like and used, and the vinyl chloride polymer is referred to as a straight vinyl chloride polymer. In case of using a vinyl chloride polymer in a plastisol processing, a sol state resin as minute resin particles are prepared by emulsion polymerization, or the like and used, and this vinyl chloride polymer is referred to as a paste vinyl chloride resin.

In case of the straight vinyl chloride polymer, a plasticizer can be included in a range of 5 to 150 parts by weight, preferably, 5 to 80 parts by weight with respect to 100 parts by weight of the polymer, and in case of the paste vinyl chloride polymer, the plasticizer can be present in a range of 5 to 150 parts by weight, preferably, 40 to 120 parts by weight with respect to 100 parts by weight of the polymer.

The resin composition can further include a filler. The filler can be present in an amount of 0 to 300 parts by weight, preferably, 50 to 200 parts by weight, more preferably, 100 to 200 parts by weight based on 100 parts by weight of the resin.

The filler can use fillers well-known in the art and is not specifically limited. For example, the filler can be a mixture of one or more kinds selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate and barium sulfate.

In addition, the resin composition can further include other additives such as a stabilizer as necessary. Each of the other additives such as the stabilizer can be, for example, 0 to 20 parts by weight, preferably, 1 to 15 parts by weight based on 100 parts by weight of the resin.

The stabilizer can use, for example a calcium-zinc-based (Ca—Zn-based) stabilizer such as a composite stearate of calcium-zinc but is not specifically limited.

The resin composition can be applied to both a melt processing and a plastisol processing as described above, and a calendaring processing, an extrusion processing, or an injection processing can be applied to the melt processing, and a coating processing, or the like can be applied to the plastisol processing.

EXAMPLES

Hereinafter, embodiments will be explained in detail to particularly explain the present invention. The present invention can, however, be embodied in different forms and should not be construed as limited to the embodiments set forth herein. Rather, these embodiments are provided so that this disclosure will be thorough and complete, and will fully convey the scope of the inventive concept to those skilled in the art.

Example 1

To a reactor equipped with a stirrer, a condenser and a decanter, 2000 g of di(2-ethylhexyl) terephthalate (GL300, LG Chem) and 340 g of n-pentyl alcohol (17 parts by weight based on 100 parts by weight of DEHTP) were injected, and transesterification was carried out under a nitrogen atmosphere at a reaction temperature of 160° C. for 2 hours to obtain a composition including di(n-pentyl) terephthalate (DnPTP), (n-pentyl)(2-ethylhexyl) terephthalate (nPEHTP) and di(2-ethylhexyl) terephthalate (DEHTP) in amounts of 6.4 wt %, 38.3 wt % and 55.3 wt %, respectively.

Example 2

To a reactor equipped with a stirrer, a condenser and a decanter, 2000 g of di(2-ethylhexyl) terephthalate (GL300, LG Chem) and 340 g of 2-methylbutyl alcohol (17 parts by weight based on 100 parts by weight of DEHTP) were injected, and transesterification was carried out under a nitrogen atmosphere at a reaction temperature of 160° C. for 2 hours to obtain a composition including di(2-methylbutyl) terephthalate (DMBTP), (2-methylbutyl) (2-ethylhexyl) terephthalate (MBEHTP) and di(2-ethylhexyl) terephthalate (DEHTP) in amounts of 6.4 wt %, 38.2 wt % and 55.4 wt %, respectively.

Example 3

A composition was prepared by mixing the composition prepared in Example 1 and the composition prepared in Example 2 in a weight ratio of 70:30.

Example 4

To a reactor equipped with a stirrer, a condenser and a decanter, 2000 g of di(2-ethylhexyl) terephthalate (GL300, LG Chem) and 220 g of n-pentyl alcohol (11 parts by weight based on 100 parts by weight of DEHTP) were injected, and transesterification was carried out under a nitrogen atmosphere at a reaction temperature of 160° C. for 2 hours to obtain a composition including di(n-pentyl) terephthalate (DnPTP), (n-pentyl)(2-ethylhexyl) terephthalate (nPEHTP) and di(2-ethylhexyl) terephthalate (DEHTP) in amounts of 2.4 wt %, 26.9 wt % and 70.7 wt %, respectively.

Example 5

A composition including di(2-methylbutyl) terephthalate (DMBTP), (2-methylbutyl) (2-ethylhexyl) terephthalate (MBEHTP) and di(2-ethylhexyl) terephthalate (DEHTP) in amounts of 2.1 wt %, 25.8 wt % and 72.1 wt %, respectively, was obtained by performing the same procedure in Example 4 except for using 220 g of 2-methylbutyl alcohol instead of n-pentyl alcohol in Example 4.

Example 6

To a reactor equipped with a stirrer, a condenser and a decanter, di(2-ethylhexyl) terephthalate (GL300, LG Chem) and 340 g of n-hexyl alcohol (17 parts by weight based on 100 parts by weight of DEHTP) were injected, and transesterification was carried out under a nitrogen atmosphere at a reaction temperature of 160° C. for 2 hours to obtain a composition including di(n-hexyl) terephthalate (DHxTP), (n-hexyl)(2-ethylhexyl) terephthalate (HxEHTP) and di(2-ethylhexyl) terephthalate (DEHTP) in amounts of 6.8 wt %, 38.8 wt % and 54.4 wt %, respectively.

Example 7

To a reactor equipped with a stirrer, a condenser and a decanter, di(2-ethylhexyl) terephthalate (GL300, LG Chem) and 340 g of n-hexyl alcohol (11 parts by weight based on 100 parts by weight of DEHTP) were injected, and transesterification was carried out under a nitrogen atmosphere at a reaction temperature of 160° C. for 2 hours to obtain a composition including di(n-hexyl) terephthalate (DHxTP), (n-hexyl)(2-ethylhexyl) terephthalate (HxEHTP) and di(2-ethylhexyl) terephthalate (DEHTP) in amounts of 1.8 wt %, 25.0 wt % and 73.2 wt %, respectively.

Example 8

To a reactor equipped with a stirrer, a condenser and a decanter, 2000 g of di(2-ethylhexyl) terephthalate (GL300, LG Chem) and 360 g of n-heptyl alcohol (18 parts by weight based on 100 parts by weight of DEHTP) were injected, and transesterification was carried out under a nitrogen atmosphere at a reaction temperature of 160° C. for 2 hours to obtain a composition including di(n-heptyl) terephthalate (DHpTP), (n-heptyl)(2-ethylhexyl) terephthalate (HpEHTP)

and di(2-ethylhexyl) terephthalate (DEHTP) in amounts of 7.9 wt %, 39.9 wt % and 52.2 wt %, respectively.

Example 9

To a reactor equipped with a stirrer, a condenser and a decanter, 2000 g of di(2-ethylhexyl) terephthalate (GL300, LG Chem) and 360 g of n-heptyl alcohol (11 parts by weight based on 100 parts by weight of DEHTP) were injected, and transesterification was carried out under a nitrogen atmosphere at a reaction temperature of 160° C. for 2 hours to obtain a composition including di(n-heptyl) terephthalate (DHpTP), (n-heptyl)(2-ethylhexyl) terephthalate (HpEHTP) and di(2-ethylhexyl) terephthalate (DEHTP) in amounts of 1.5 wt %, 23.2 wt % and 75.3 wt %, respectively.

Comparative Example 1

Di(2-ethylhexyl) terephthalate (DEHTP, LGflex GL300) which was a product of LG Chem, was used as a plasticizer composition.

Comparative Example 2

A composition (LGflex GL500) including dibutyl terephthalate (DBTP), butyl(2-ethylhexyl) terephthalate (BEHTP) and di(2-ethylhexyl) terephthalate (DEHTP) in 6.4 wt %, 38.8 wt % and 54.9 wt %, respectively, as a product of LG Chem, was used as a plasticizer composition.

Comparative Example 3

A composition (LGflex GL520) including dibutyl terephthalate (DBTP), butyl(2-ethylhexyl) terephthalate (BEHTP) and di(2-ethylhexyl) terephthalate (DEHTP) in 4.1 wt %, 25.7 wt % and 70.2 wt %, as a product of LG Chem, was used as a plasticizer composition.

Comparative Example 4

To a reactor equipped with a stirrer, a condenser and a decanter, 2000 g of diisononyl terephthalate (DINTP) and 360 g of n-pentyl alcohol (18 parts by weight based on 100 parts by weight of DINTP) were injected, and transesterification was carried out under a nitrogen atmosphere at a reaction temperature of 160° C. for 2 hours to obtain a composition including di(n-pentyl) terephthalate (DPTP), (n-pentyl)(isononyl) terephthalate (PINTP) and diisononyl terephthalate (DINTP) in amounts of 7.1 wt %, 40.1 wt % and 52.8 wt %, respectively.

Comparative Example 5

To a reactor equipped with a stirrer, a condenser and a decanter, 2000 g of diisononyl terephthalate (DINTP) and 220 g of n-pentyl alcohol (11 parts by weight based on 100 parts by weight of DINTP) were injected, and transesterification was carried out under a nitrogen atmosphere at a reaction temperature of 160° C. for 2 hours to obtain a composition including di(n-pentyl) terephthalate (DPTP), (n-pentyl)(isononyl) terephthalate (PINTP) and diisononyl terephthalate (DINTP) in amounts of 1.6 wt %, 22.7 wt % and 75.7 wt %, respectively.

Experimental Example 1: Evaluation of Performance of Hard Sheet

By using the plasticizers of the Examples and the Comparative Examples, specimens were manufactured according to the formulation and manufacturing conditions below and ASTM D638.

(1) Formulation: 100 parts by weight of a straight vinyl chloride polymer (LS100S), 30 parts by weight of a plasticizer and 3 parts by weight of a stabilizer (BZ-153T)

(2) Mixing: mixing at 98° C. in 700 rpm (3) Manufacture of specimen: 1T and 3T sheets were manufactured by processing at 160° C. for 4 minutes using a roll mill, and at 180° C. for 2.5 minutes (low pressure) and 2 minutes (high pressure) using a press (4) Test Items 1) Hardness: Shore hardness (Shore "A" and "D") at 25° C., was measured using a 3T specimen for 10 seconds using ASTM D2240. The plasticization efficiency was assessed excellent if the value was small.

2) Tensile strength: By an ASTM D638 method, a specimen was drawn in a cross-head speed of 200 mm/min using a test apparatus of U.T.M (manufacturer: Instron, model name: 4466), and a point where the 1T specimen was cut was measured. The tensile strength was calculated as follows:

Tensile strength (kgf/cm$^2$)=load value (kgf)/thickness (cm)×width (cm)

3) Elongation rate measurement: By an ASTM D638 method, a specimen was drawn in a cross-head speed of 200 mm/min using a test apparatus of U.T.M., and a point where the 1T specimen was cut was measured. The elongation rate was calculated as follows:

Elongation rate (%)=length after elongation/initial length×100

4) Migration loss measurement: According to KSM-3156, a specimen with a thickness of 2 mm or more was obtained, glass plates were attached onto both sides of the 1T specimen and a load of 1 kgf/cm$^2$ was applied. The specimen was stood in a hot air circulation type oven (80° C.) for 72 hours and then taken out and cooled at room temperature for 4 hours. Then, the glass plates attached onto both sides of the specimen were removed, the weights of the specimen before and after standing the glass plates and the specimen in the oven were measured, and the migration loss was calculated as follows:

Migration loss (%)={(initial weight of specimen at room temperature−weight of specimen after standing in oven)/initial weight of specimen at room temperature}×100

5) Volatile loss measurement: The specimen manufactured was processed at 80° C. for 72 hours, and the weight of the specimen was measured.

Volatile loss (wt %)=weight of initial specimen− (weight of specimen after processing at 80° C. for 72 hours)/weight of initial specimen×100

6) Absorption Rate Measurement

Absorption rate was evaluated by measuring the time (mm:ss) required for mixing a resin and an ester compound and stabilizing the torque of a mixer by using a planetary mixer (Brabender, P600) in conditions of 77° C. and 60 rpm.

(5) Evaluation Results

The evaluation results on the test items are listed in Table 1 below.

TABLE 1

|  | Hardness (Shore A) | Hardness (Shore D) | Migration loss (%) | Volatile loss (%) | Tensile strength kgf/cm$^2$ | Elongation rate (%) |
| --- | --- | --- | --- | --- | --- | --- |
| Example 1 | 97.5 | 59.6 | 1.65 | 0.98 | 268.3 | 308.7 |
| Example 2 | 97.8 | 60.0 | 1.78 | 1.23 | 267.9 | 293.1 |
| Example 3 | 97.6 | 59.6 | 1.67 | 0.99 | 268.0 | 305.7 |
| Example 4 | 97.8 | 59.8 | 1.88 | 0.86 | 268.9 | 310.5 |
| Example 5 | 98.0 | 59.6 | 1.69 | 0.90 | 268.2 | 305.4 |
| Example 6 | 98.2 | 59.6 | 2.12 | 0.91 | 265.6 | 301.2 |
| Example 7 | 98.4 | 59.7 | 2.10 | 0.80 | 268.4 | 305.2 |
| Example 8 | 98.6 | 59.9 | 2.25 | 0.80 | 266.2 | 294.1 |
| Example 9 | 98.7 | 59.9 | 2.37 | 0.79 | 266.7 | 298.6 |
| Comparative Example 1 | 99.8 | 61.6 | 3.81 | 0.78 | 264.7 | 296.9 |
| Comparative Example 2 | 97.4 | 59.4 | 3.12 | 2.54 | 248.5 | 287.7 |
| Comparative Example 3 | 98.2 | 59.8 | 3.54 | 2.01 | 250.3 | 281.4 |
| Comparative Example 4 | 99.6 | 61.5 | 4.62 | 1.16 | 257.0 | 274.3 |
| Comparative Example 5 | 99.9 | 61.9 | 4.41 | 0.80 | 253.2 | 270.2 |

Referring to Table 1, it was confirmed that overall physical properties of Examples 1 to 9 were well-balanced when compared with Comparative Examples 1 to 5. In case of Comparative Example 1 using di(2-ethylhexyl) terephthalate of GL300 as an existing product, there were problems of poor plasticization efficiency and inferior migration, in cases of Comparative Example 2 using GL500 and Comparative Example 3 using GL520, plasticization efficiency was improved but there were problems of inferior elongation rate and tensile strength, and in cases of Comparative Examples 4 and 5, in which lower alkyl and higher alkyl carbon numbers were 5 and 9, respectively, there was no improvement of plasticization efficiency but migration, elongation rate and tensile strength were rather deteriorated when compared with Comparative Example 1. However, Examples 1 to 9 showed significant effects of migration, and largely improved elongation rate and tensile strength, and plasticization efficiency were also found to be maintained to an equivalent level.

Through the results, it was confirmed that the plasticizers of the Examples can become alternate materials which can improve inferior physical properties such as migration and mechanical properties without deteriorating excellent physical properties when compared with the existing product.

Experimental Example 2: Evaluation of Performance of Soft Sheet

By using the plasticizers of the Examples and the Comparative Examples, specimens were manufactured according to the formulation and manufacturing conditions below and ASTM D638.

(1) Formulation: 100 parts by weight of a straight vinyl chloride polymer (LS100S), 60 parts by weight of a plasticizer and 3 parts by weight of a stabilizer (BZ-153T)

(2) Mixing: mixing at 98° C. in 700 rpm (3) Manufacture of specimen: 1T and 3T sheets were manufactured by processing at 160° C. for 4 minutes using a roll mill, and at 180° C. for 2.5 minutes (low pressure) and 2 minutes (high pressure) using a press (4) Test Items 1) Hardness (plasticization efficiency): Shore hardness (Shore "A" and "D") at 25° C. was measured using a 3T specimen according to ASTM D2240. The plasticization efficiency was assessed excellent if the value was small.

2) Tensile strength: By an ASTM D638 method, a specimen was drawn in a cross-head speed of 200 mm/min using a test apparatus of U.T.M (manufacturer: Instron, model name: 4466), and a point where the 1T specimen was cut was measured. The tensile strength was calculated as follows.

Tensile strength (kgf/cm$^2$)=load value (kgf)/thickness (cm)×width (cm)

3) Elongation rate measurement: By an ASTM D638 method, a specimen was drawn in a cross-head speed of 200 mm/min using a test apparatus of U.T.M, and a point where the 1T specimen was cut was measured. The elongation rate was calculated as follows.

Elongation rate (%)=length after elongation/initial length×100

4) Migration loss measurement: Glass plates were attached onto both sides of the 1T specimen and a load of 1 kgf/cm$^2$ was applied. The specimen was stood in a hot air circulation type oven (80° C.) for 72 hours and then taken out and cooled at room temperature for 4 hours. Then, the glass plates attached onto both sides of the specimen were removed, the weights of the specimen before and after standing the glass plates and the specimen in the oven were measured, and the migration loss was calculated as follows.

Migration loss (%)={(initial weight of specimen at room temperature−weight of specimen after standing in oven)/initial weight of specimen at room temperature}×100

5) Volatile loss measurement: The specimen manufactured was processed at 80° C. for 72 hours, and the weight of the specimen was measured.

Volatile loss (wt %)=weight of initial specimen− (weight of specimen after processing at 80° C. for 72 hours)/weight of initial specimen×100

6) Stress test (stress resistance): A specimen with a thickness of 2 mm in a bent state was stood at 23° C. for 168 hours, and the degree of migration (degree of oozing) was observed. The results were recorded as numerical values, and excellent properties were shown if the quantity was closer to 0.

(5) Evaluation Results

The evaluation results on the test items are listed in Table 2 below.

TABLE 2

|  | Hardness (Shore A) | Hardness (Shore D) | Migration loss (%) | Volatile loss (%) | Tensile strength kgf/cm² | Elongation rate (%) | Stress resistance |
|---|---|---|---|---|---|---|---|
| Example 1 | 78.1 | 33.0 | 5.33 | 0.92 | 194.1 | 359.9 | 0 |
| Example 2 | 79.0 | 33.5 | 5.80 | 1.48 | 189.0 | 349.8 | 0 |
| Example 3 | 78.3 | 33.1 | 5.40 | 0.98 | 194.2 | 356.2 | 0 |
| Example 4 | 79.0 | 33.4 | 5.23 | 0.76 | 198.6 | 346.7 | 0 |
| Example 5 | 79.4 | 33.5 | 5.25 | 0.84 | 192.5 | 348.2 | 0 |
| Example 6 | 79.3 | 33.4 | 5.87 | 0.83 | 191.9 | 349.3 | 0.5 |
| Example 7 | 79.8 | 33.6 | 5.64 | 0.78 | 196.4 | 345.7 | 0.5 |
| Example 8 | 80.0 | 33.9 | 6.07 | 0.71 | 194.7 | 339.4 | 1.0 |
| Example 9 | 80.6 | 34.2 | 5.89 | 0.65 | 199.2 | 340.5 | 1.5 |
| Comparative Example 1 | 81.0 | 34.7 | 8.29 | 0.76 | 190.7 | 319.7 | 3 |
| Comparative Example 2 | 77.9 | 32.3 | 6.57 | 2.55 | 178.0 | 325.2 | 0 |
| Comparative Example 3 | 79.0 | 33.5 | 6.89 | 2.20 | 180.3 | 324.5 | 0 |
| Comparative Example 4 | 82.0 | 35.8 | 7.68 | 0.53 | 182.3 | 324.9 | 2.5 |
| Comparative Example 5 | 83.3 | 36.7 | 7.89 | 0.50 | 184.5 | 321.4 | 3 |

Referring to Table 2, it was confirmed that overall physical properties of Examples 1 to 9 were well-balanced when compared with Comparative Examples 1 to 5. In case of Comparative Example 1 using di(2-ethylhexyl) terephthalate of GL300 as an existing product, there were problems of poor plasticization efficiency and inferior migration, in cases of Comparative Example 2 using GL500 and Comparative Example 3 using GL520, plasticization efficiency was improved but there were problems of inferior elongation rate and tensile strength, and in cases of Comparative Examples 4 and 5, in which lower alkyl and higher alkyl carbon numbers were 5 and 9, respectively, there was no improvement of plasticization efficiency but migration, elongation rate, and tensile strength were rather deteriorated when compared with Comparative Example 1, and stress resistance showed no improvement when compared with an existing product. However, Examples 1 to 9 showed significant effects of migration, largely improved elongation rate and tensile strength, and improved stress resistance, and plasticization efficiency were also found to be maintained to an equivalent level.

Through the results, it was confirmed that the plasticizers of the Examples can become alternate materials which can improve inferior physical properties such as migration and mechanical properties without deteriorating excellent physical properties and improve stress resistance when compared with the existing product.

Experimental Example 3: Evaluation of Performance of Plastisol for Gloves

By using the plasticizers of the Examples and the Comparative Examples, specimens were manufactured according to the formulation and manufacturing conditions below and ASTM D638.

(1) Formulation: 100 parts by weight of a paste vinyl chloride polymer (LS170G), 75 parts by weight of a plasticizer, 20 parts by weight of a viscosity decreasing agent (YKD80), and 1 part by weight of a stabilizer (CZ400)

(2) Mixing: mixing in 1500 rpm for 20 minutes and 1000 rpm for 20 minutes (3) Manufacture of specimen: A specimen was manufactured by spreading mixed plastisol into a thickness of 0.3 mm and curing at 230° C. for 2 minutes using an oven.

(4) Test Items

1) Viscosity: measured as Brookfield viscosity using a Brookfield (LV type) viscometer, and #62 was used as a spindle, measurement rate was 6 rpm, and measurement temperature was 25° C. and 60° C.

2) Tensile strength: By an ASTM D412 method, a specimen was drawn in a cross-head speed of 100 mm/min using a test apparatus of U.T.M (manufacturer: Instron, model name: 4466), and a point where the specimen was cut was measured. The tensile strength was calculated as follows:

Tensile strength (kgf/cm²)=load value (kgf)/thickness (cm)×width (cm)

3) Elongation rate measurement: By an ASTM D412 method, a specimen was drawn in a cross-head speed of 100 mm/min using a test apparatus of U.T.M., and a point where the specimen was cut was measured. The elongation rate was calculated as follows:

Elongation rate (%)=length after elongation/initial length×100

4) Migration loss measurement: Glass plates were attached onto both sides of the specimen and a load of 1 kgf/cm² was applied. The specimen was stood in a hot air circulation type oven (60° C.) for 72 hours and then taken out and cooled at room temperature for 4 hours. Then, the glass plates attached onto both sides of the specimen were removed, the weights of the specimen before and after standing the glass plates and the specimen in the oven were measured, and the migration loss was calculated as follows:

Migration loss (%)={(initial weight of specimen at room temperature−weight of specimen after standing in oven)/initial weight of specimen at room temperature}×100

(5) Evaluation Results

The evaluation results on the test items are listed in Table 3 below.

TABLE 3

|  | 25° C. viscosity (cP) 1 hr | 25° C. viscosity (cP) 1 day | 25° C. viscosity (cP) change ratio (%) | 60° C. viscosity (cP) 1 hr | 60° C. viscosity (cP) 1 day | 60° C. viscosity (cP) change ratio (%) | Migration loss (%) | Tensile strength (MPa) | Elongation rate (%) |
|---|---|---|---|---|---|---|---|---|---|
| Example 1 | 235 | 250 | 6.4 | 160 | 205 | 28.1 | 9.36 | 13.2 | 364.8 |
| Example 2 | 240 | 265 | 10.4 | 155 | 215 | 38.7 | 9.13 | 13.9 | 370.3 |
| Example 3 | 235 | 255 | 8.5 | 155 | 210 | 35.5 | 9.21 | 13.5 | 368.9 |
| Example 4 | 205 | 215 | 4.9 | 150 | 175 | 16.7 | 9.53 | 13.3 | 363.5 |
| Example 5 | 215 | 235 | 9.3 | 155 | 185 | 19.4 | 9.76 | 13.5 | 365.2 |
| Example 6 | 210 | 245 | 16.7 | 135 | 170 | 25.9 | 10.91 | 12.5 | 360.3 |
| Example 7 | 220 | 255 | 15.9 | 140 | 170 | 21.4 | 10.90 | 12.8 | 362.8 |
| Example 8 | 225 | 260 | 15.6 | 135 | 160 | 18.5 | 10.96 | 13.4 | 368.0 |
| Example 9 | 230 | 270 | 17.4 | 125 | 160 | 28.0 | 10.84 | 13.5 | 359.4 |
| Comparative Example 1 | 225 | 300 | 33.3 | 120 | 190 | 58.3 | 11.34 | 11.9 | 320.5 |
| Comparative Example 2 | 190 | 240 | 26.3 | 130 | 290 | 123.0 | 8.23 | 11.0 | 335.5 |
| Comparative Example 3 | 200 | 255 | 27.5 | 110 | 190 | 72.7 | 10.91 | 11.6 | 340.3 |
| Comparative Example 4 | 225 | 290 | 28.9 | 105 | 180 | 71.4 | 10.96 | 12.2 | 348.0 |
| Comparative Example 5 | 240 | 300 | 25.0 | 110 | 200 | 81.8 | 11.56 | 12.3 | 350.3 |

Referring to Table 3, it was confirmed that the change of viscosity with the passage of time of Examples 1 to 9 showed significant stability at room temperature and at a high temperature. On the contrary, in Comparative Examples 1 to 5, Comparative Example 1 using an existing product of GL300 was confirmed to show twice or more times change with the passage of time and somewhat decreased stability when compared with the Examples, and Comparative Examples 2 to 5, which corresponded to improved products of Comparative Example 1, were confirmed to show significantly inferior degree of viscosity change with the passage of time.

In addition, with respect to the tensile strength and elongation rate, Comparative Examples 1 to 5 were found to be significantly inferior to Examples 1 to 9, and particularly, it was found that the elongation rate was poor by 10% or more.

That is, if examining Experimental Examples 1 to 3, in case of applying one including a terephthalate of the same carbon number type and a terephthalate of a different carbon number type, wherein alkyl groups bonded to two ester groups of the terephthalate of a different carbon number type have 5 to 7 carbon atoms and 8 carbon atoms, respectively, as the plasticizer composition according to an embodiment of the present invention, achieved significantly excellent effects when compared with a case of otherwise, and it was found that a difference between an alkyl group having a carbon number difference of 3 or less and that having a carbon number difference of 4 which is greater than 3 was significant.

The invention claimed is:

1. A plasticizer composition, comprising:
   two or more kinds of terephthalates of the same carbon number type, wherein the carbon number of alkyl groups bonded to two ester groups is the same; and
   one or more kinds of terephthalates of a different carbon number type, wherein:
   the carbon number of alkyl groups bonded to two ester groups is different,
   the different carbon number type comprises a higher alkyl and a lower alkyl,
   the higher alkyl is an alkyl group having a carbon number of 8,
   the lower alkyl is selected from alkyl groups having a carbon number of 5, 6 or 7,
   wherein the two or more kinds of terephthalates of the same carbon number type comprise one kind of a higher alkyl terephthalate and one kind of lower alkyl terephthalate.

2. The plasticizer composition according to claim 1, wherein the different carbon number type comprises:
   a higher alkyl having 8 carbon atoms, and
   a lower alkyl having 6 or 7 carbon atoms.

3. The plasticizer composition according to claim 1, wherein the plasticizer composition has a degree of branching of 2.0 or less based on total alkyl groups having the same carbon number in the composition.

4. The plasticizer composition according to claim 1, wherein the same carbon number type comprises two or more selected from the group consisting of di(2-ethylhexyl) terephthalate, di(n-pentyl) terephthalate, diisopentyl terephthalate, (n-pentyl)isopentyl terephthalate, di(n-hexyl) terephthalate, diisohexyl terephthalate, (n-hexyl)isohexyl terephthalate, di(n-heptyl) terephthalate, diisoheptyl terephthalate and (n-heptyl)isoheptyl terephthalate.

5. The plasticizer composition according to claim 1, wherein the different carbon number type comprises one or more selected from the group consisting of (n-pentyl)(2-ethylhexyl) terephthalate, (isopentyl)(2-ethylhexyl) terephthalate, (n-hexyl)(2-ethylhexyl) terephthalate, isohexyl(2-ethylhexyl) terephthalate, (n-heptyl)(2-ethylhexyl) terephthalate and isoheptyl(2-ethylhexyl) terephthalate.

6. The plasticizer composition according to claim 1, comprising:
   0.5 to 50 wt % of the lower alkyl terephthalate;
   3.0 to 70 wt % of the terephthalate of a different carbon number type; and
   0.5 to 95 wt % of the higher alkyl terephthalate, based on the total weight of the plasticizer composition.

* * * * *